United States Patent [19]

Eckberg

[11] Patent Number: 5,739,984
[45] Date of Patent: Apr. 14, 1998

[54] DAMPING LOOP FOR A TAPE DRIVE ACTUATOR WITH A SERVO CONTROL SYSTEM

[75] Inventor: Eric Alan Eckberg, Rochester, Minn.

[73] Assignee: International Business Machines Corporation, Armonk, N.Y.

[21] Appl. No.: 704,072

[22] Filed: Aug. 28, 1996

[51] Int. Cl.$^6$ ............................................. G11B 5/55
[52] U.S. Cl. .................................................. 360/106
[58] Field of Search ..................................... 360/106, 109

[56] References Cited

U.S. PATENT DOCUMENTS

| | | | |
|---|---|---|---|
| 4,476,404 | 10/1984 | Bygdnes | 310/27 |
| 4,571,649 | 2/1986 | Goss | 360/106 |
| 4,722,014 | 1/1988 | Takekado | 360/106 |
| 4,843,503 | 6/1989 | Hazebrouck et al. | 360/106 |
| 4,908,816 | 3/1990 | Champagne | 360/109 |
| 5,047,883 | 9/1991 | Aldrich et al. | 360/109 |
| 5,115,363 | 5/1992 | Khan et al. | 360/104 |
| 5,121,273 | 6/1992 | Slezak | 360/104 |
| 5,151,839 | 9/1992 | Ota | 360/108 |
| 5,305,168 | 4/1994 | Lin et al. | 360/104 |
| 5,414,578 | 5/1995 | Lian | 360/106 |

*Primary Examiner*—A. J. Heinz
*Attorney, Agent, or Firm*—Matthew J. Bussan; Robert W. Lahtinen

[57] ABSTRACT

A high density data storage tape drive includes an actuator which carries the read/write head, is driven by a voice coil and enables translational movement of the head in a direction transverse to the direction of tape travel as the tape is scrolled by the head. This permits the head to follow a servo track and position the head with a data track without skewing the transducer gap with respect to the data track. Since the actuator moving portion has stiffness and mass, it is subject to vibration at resonant frequencies, with the first or lowest resonant frequency commonly occurring within the operating bandwidth of the device. To attenuate the vibration amplitude during resonance, a damping device is provided to enable greater use of the servo system potential for track and bit density enhancement, rather than diminishing storage density performance to accommodate a worst case condition.

9 Claims, 5 Drawing Sheets

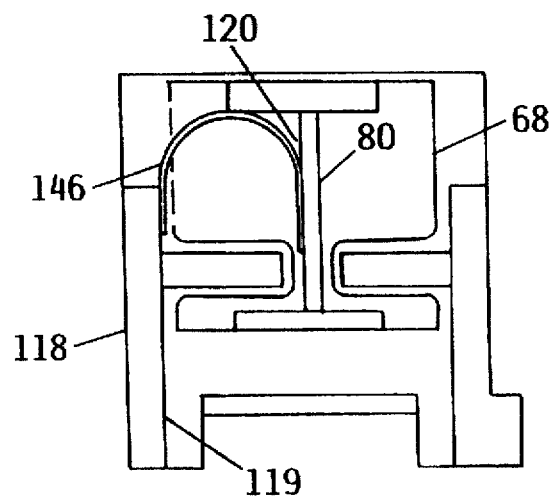
FIG. 4
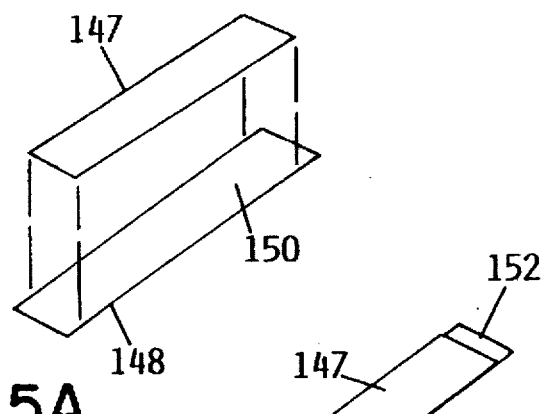
FIG. 5A
FIG. 5B
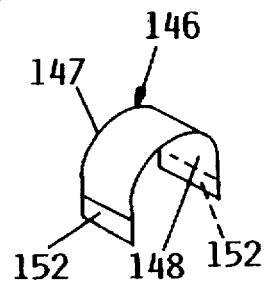
FIG. 5C

DAMPING LOOP FOR A TAPE DRIVE ACTUATOR WITH A SERVO CONTROL SYSTEM

FIELD OF THE INVENTION

This invention relates to tape drives for data recording and more specifically to the recording of high density data on magnetic tape in a reliable manner so that the data may be accurately retrieved.

BACKGROUND OF THE INVENTION

Magnetic tape data storage devices have long been in common use, but recent enhanced areal storage density standards have required improved reading and recording apparatus and techniques to achieve the required data handling reliability. The prior technique has been to record data in a plurality of parallel data tracks on the magnetic tape by positioning the head relative to the tape path by moving the read/write head relative to the tape path by moving the read/write head relative to the tape to different track positions as desired and then holding the read/write head stationary. In such a system, the tape tracks must both be sufficiently wide and separated to guarantee that the exposure of the data track to the head is accurate at least to the minimum requirements necessary to reliably read and write data. The read/write head is positioned at a predetermined fixed point, relative to the magnetic tape path and the data track must accommodate variations of recording track location and tape location variances as the tape feeds past the head. Historically, this accommodation has been accomplished insuring that the track width and the data track separation on the magnetic tape are sufficient for the read/write head to remain positioned over the designated track and at the same time not read magnetically recorded signals from an adjacent track. This arrangement of track width and track separation will accommodate any deviation of the track location from the design norm either due to being recorded on a first recorder and played or rerecorded on a second recorder or due to the wander of the tape as it is spooled past the read/write head from one spool to the other spool of a cartridge.

The definition of the magnetic read/write head and the track width and separations effectively limits the number of data tracks that may be recorded on any given width of tape. Reliance solely on the track width and track separations to insure reliable read/write operations results in a significant waste of magnetic tape surface and thus limits the data density on the tape.

Whenever the positional requirements of the system are satisfied, the resulting track width and spacing clearly limit the number of data tracks. Data may be recorded in tracks that are much narrower and still be reliable from a read/write standpoint, but the read/write head must be and remain perfectly aligned with the data track. However, as the data track width and read/write head width narrow in an effort to increase the data capacity of a given tape area, any misalignment of the head with the track may lead to read/write repeatability failures and lost data. Thus, the resolution of the head placement mechanism and the precision of the placement of the tape relative to the read/write head become limiting factors affecting the recording density of data on the magnetic tape surface in tape drives having static read/write heads.

In order to overcome the limitation in data density described above, the alignment of the magnetic tape data recording track relative to the read/write head gap of the read/write head must be greatly improved or controlled. Since it is not as practical to attempt to control the tape path and the data track position based on tape position, the choice devolves to controlling the read/write head more precisely and on a responsive basis.

Efforts to control the head of a tape drive on a real-time basis to maintain the head/data track alignment use a servo control to finely position the head relative to the coarse positioning of the stepper motor drive that drives the head carriage to a detented or static position.

In order to position the head precisely relative to a moving data track on tape, a servo read/write head positioning drive is incorporated into the tape drive system. Atypical tape cartridge standard defines a pattern of servo tracks and data tracks that must be adhered to insure compatibility of cartridges recorded on one recorder and read on another recorder. To provide the locational control of the servo read/write head positioning drive, a magnetic read head gap may be placed at position relative to a servo track on the tape. Then the read head gap is further moved to detect the edge of the servo control track (servo track) recorded on the tape. The read head will provide signals which may be used to indicate the head location relative to the servo track. By using these signals as a basis, the servo control than may produce a positioning signal to drive a servo positioner. The servo positioner moves the read head, causing the head to track or follow the edge of the servo control track which has been previously recorded on the tape.

Thus as the servo control track deviates from perfect positioning relative to the read head (servo tracking head), the servo control will activate and move the servo tracking head to follow the servo track. The mass of the apparatus used for servo tracking should be as small as possible in order to be responsive and to facilitate very precise placement of the servo tracking head.

The actuator that enables precise positioning of the transducer head, utilizing the servo system, typically suspends the head using a spring system that possesses mass and stiffness. Such an actuator suspension and drive system has resonant frequencies with the first natural resonance mode having a frequency below the closed loop bandwidth. The amplitude of this resonance must be reduced if the benefits of transducer head servo control are to be realized.

SUMMARY OF THE INVENTION

The actuator servo system enables a significant increase in the potential areal storage density by facilitating the accurate alignment of the head to permit narrower data tracks and closer spacing. This enhancement can not be fully realized if resonant frequencies are encountered and the design is compromised to tolerate the worst case condition.

In the structure illustrative of the present invention, a damper interconnects the actuator carriage and the substantially rigid moving structure of the actuator that is driven by the voice coil. In one illustrated embodiment, a U-shaped constrained layer damper is connected to the actuator carriage at one end and to the head mounting structure at the other end. This provides a damping function while not inhibiting the translational motion of the head as the servo system positions the head at a desired location of track alignment.

In a second illustrated embodiment, the constrained layer damper is interconnected between the carriage and the voice coil support. To enhance the damping effectiveness, the damping member can be attached to the moving actuator portion at a location as remote as possible from the pivot location. The voice coil mounting structure is commonly at a greater distance from the pivot than the transducer head.

Damping might also be achieved by utilizing an existing element extending from the actuator moving assembly to a stationary portion of the drive. The electrical conductors connecting the device electronics to the voice coil and transducer head are normally provided using flat, flex cables or a single combined flex cable. The damping structure may be combined with the flex cable to afford the resonant frequency amplitude damping function; however, the application of a damping structure must be achieved using a design that maintains the conductors at a neutral axis so that the cable life is not compromised.

BRIEF DESCRIPTION OF THE DRAWINGS

FIG. 4 is an elevation of a carriage portion and head supporting elements with a constrained layer damper attached thereto.

FIGS. 5A–5C show a constrained layer damper structure in an exploded view (A), an assembled view (B) and formed in a C-shaped configuration (C).

DETAILED DESCRIPTION

Figure 1:
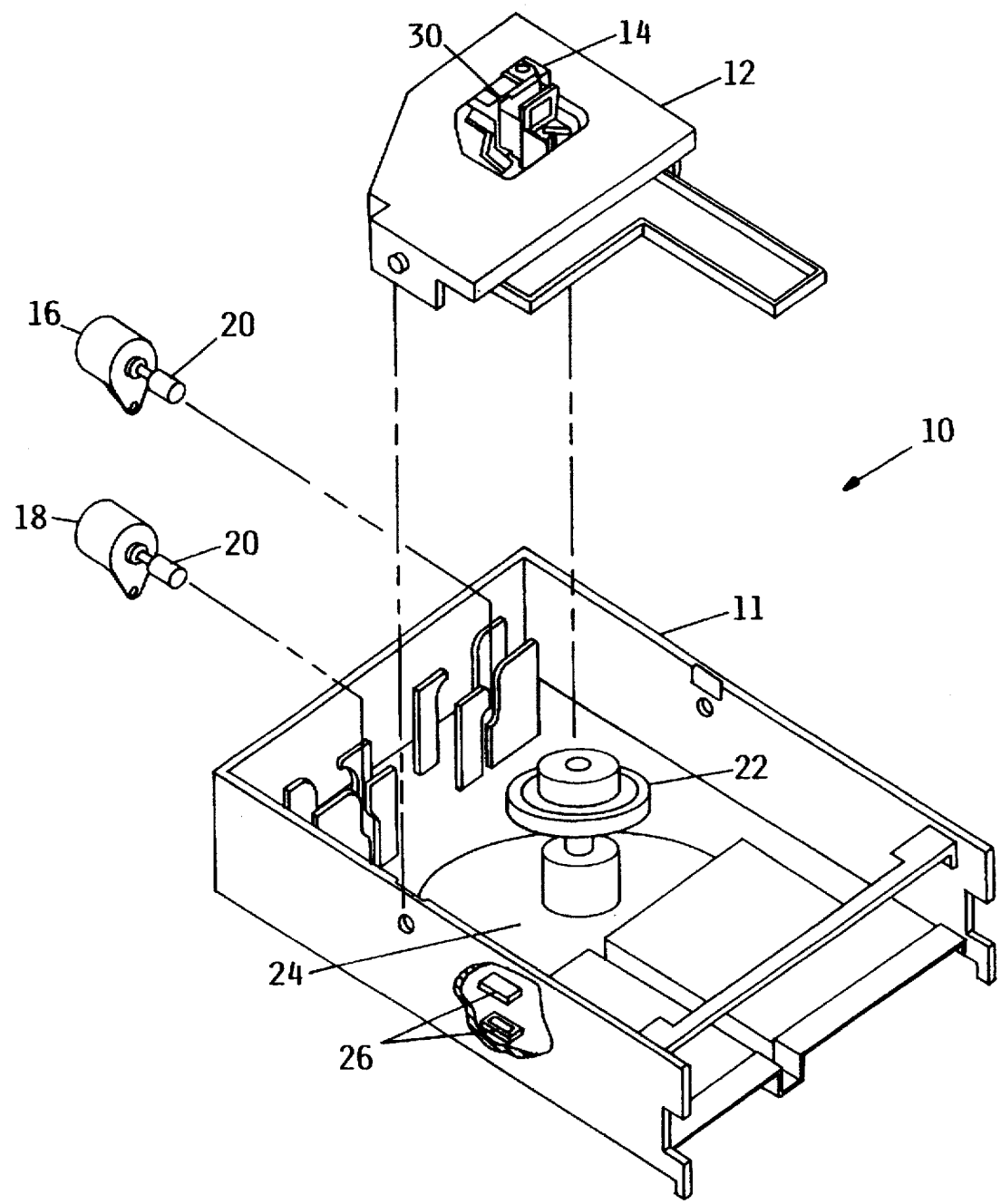
FIG. 1 is a perspective view of a partially disassembled tape drive, with portions, such as the cover, removed for clarity.

FIG. 1 illustrates portions of a tape drive in which the invention may be used. Shown is a tape drive 10 with cover removed for visibility and with bridge 12 exploded out and removed from the tape drive chassis 11. The bridge 12 supports the magnetic read/write head positioning assembly 14. Read/write head positioning assembly 14 is illustrated in FIG. 2 as an exploded view and will be described in more detail with that figure.

Stepper motors 16 and 18 are supported by chassis 11 of the tape drive 10. Read/write head positioning stepper motor 16 through gear 20, preferably a worm gear, provides the positioning drive to position the read/write head positioning assembly 14 relative to bridge 12. Tape cartridge receive/eject stepper motor 18 provides the drive for receiving and ejecting cartridges (not shown) from the tape drive 10.

Tape drive 10 is further provided with the capstan drive 22 to feed the tape (not shown). Capstan drive 22 comprises a soft rubber wheel or roller to engage the tape of a cartridge for feeding purposes and is driven by a capstan drive motor 24. The tape drive 10 also includes a cartridge sensor 26. Cartridge sensor 26 may be advantageously disposed in an area where no other elements of the tape drive 10 need be present nor where the cartridge will be resident. Further, cartridge sensor 26 is comprised of a pair of electronic elements, typically a light emitting diode and a photo detector forming an LED photo/receptor pair.

Figure 2:
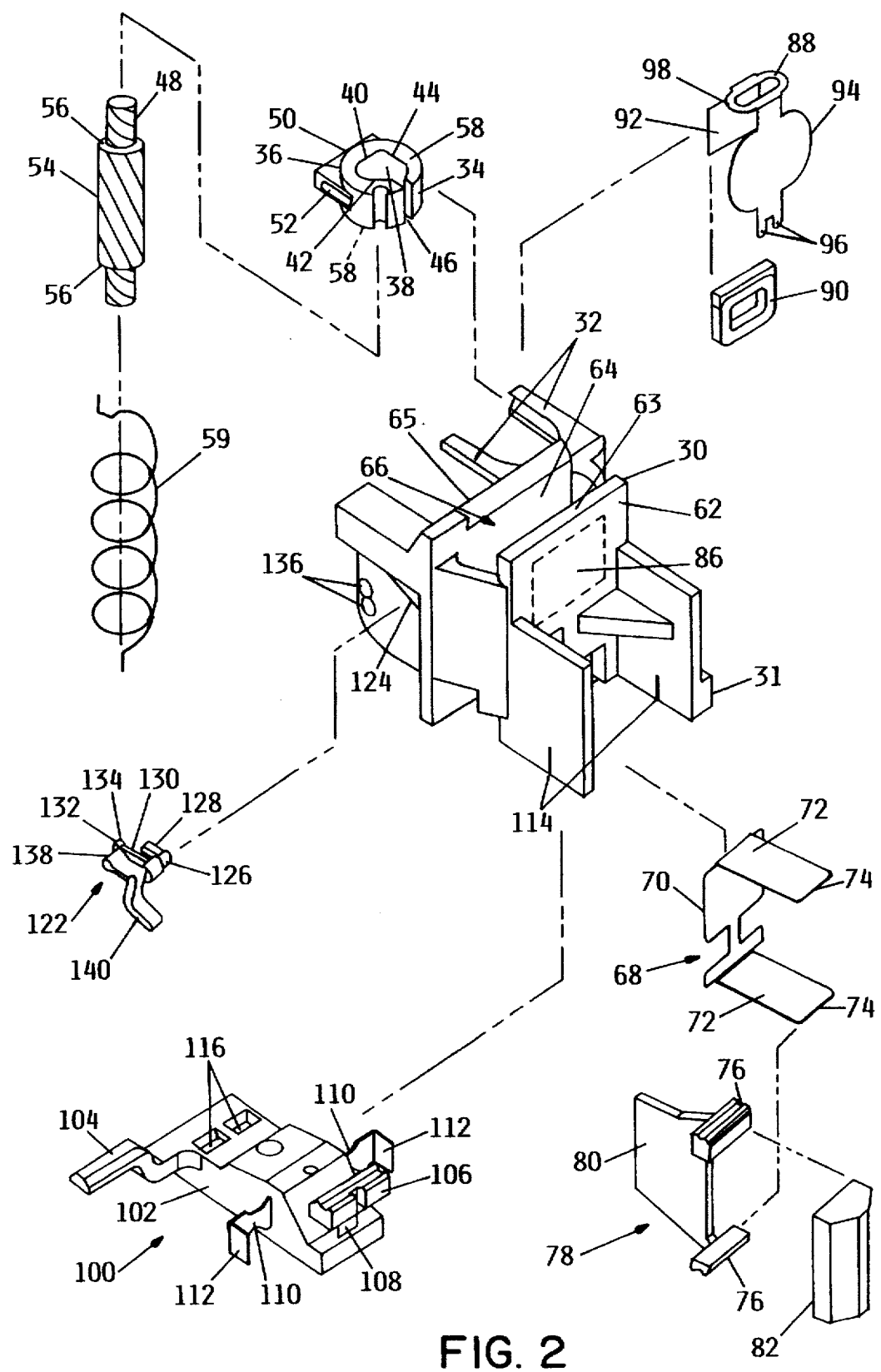
FIG. 2 is an exploded perspective view of the carriage assembly showing the characteristics of the various parts thereof.

Referring to FIG. 2, carriage 30 is illustrated as having a bearing support structure 32. Bearing support structure 32 is comprised of a pair of arms projecting from carriage 30 and which have grooves formed in the facing surfaces thereof to accept bearing 34. Although only one bearing 34 is visible, bearing 34 is duplicated with a substantially identical bearing support structure directly below the one illustrated so that a pair of such bearings 34 are supported by a pair of such support structures 32.

Typically, bearing 34 is molded of a plastic material and is comprised of a cylindrical form 36 having an interior opening 38. The interior opening 38 is characterized by three planar surfaces 40, 42, and 44. A gap 46 in cylindrical form 36 allows lead screw 48 to be inserted within the interior opening 38. In so doing, planar walls 42 and 44 will be slightly spread apart, widening gap 46. As the cylindrical form 36 attempts to close back to its original state, wall 42 will force the lead screw 48 into positioning engagement with planar surfaces 40 and 44, thereby insuring accurate placement of the lead screw 48 relative to bearing 34. Bearing 44 is further provided with a partial flange 50 having ribs 52 which will mate with the planar surfaces of bearing support structure 32.

Geared nut 54 is threaded onto lead screw 48 and whenever lead screw 48 is held stationary by mounting lead screw 48 into bridge 12, the rotation of geared nut 54 by worm gear 20 on the read/write head positioning stepper motor 16 will cause nut 54 to be progressively raised or lowered with respect to lead screw 48. The end surfaces 56 of geared nut 54 lie in abutting relationship to the end surface 58 of bearing 34. The force controlling the raising and lowering of the carriage 30 is exerted on the bottom bearing 34 due to the influence of the pre-load spring 59 which engages the carriage 30 and bridge 12 to bias the carriage 30 upward. Pre-load spring 59 maintains contact between geared nut 54 and bottom bearing 34 except when carriage 30 is driven to an end-of-track position such as when the servo-control latch is activated.

Carriage 30 has a pair of parallel vertical walls 62 and 64. Vertical walls 62 and 64 form a cavity 66. The carriage 30, made of a soft magnetic material, can carry magnetic flux of a voice coil motor (VCM) and will aid in controlling stray flux and help to prevent adverse effect of stray magnetic fields on the magnetic tape. If desired, only walls 62, 64 need be of soft magnetic material. Additionally, carriage 30 is provided with an anti-rotation boss 31 disposed as close to the read/write head 82 as possible to prevent undue rotation of carriage 30 under the influence of spring 59. Anti-rotation boss 31 slideably engages bridge 12 and provides a consistent datum relative to bridge 12.

To mount the read/write head 82 on carriage 30, leaf spring 68 is formed of thin flat spring stock and is bent to result in a "C" shape or three sides of a rectangle. The middle section 70 of leaf spring 68 is attached at its ends to cantilevered beam springs 72. Middle section 70 is attachable to vertical wall 62 with epoxy or other suitable adhesives. The free ends 74 of beam springs 72 are attached to attachment bars 76 of web 78. Web 78 is formed having a planar section 80 and two attachment bars 76 and may be integrally molded of plastic or other suitable material for ease of fabrication. Attachment bars 76 may be adhesively bonded or insert molded onto the free ends 74 of cantilever beam sections 72, thereby maintaining a constant spacing between the free ends 74 of springs 72 and adding rigidity to the structure in a twisting mode. The free ends 74 of beam springs 72 may flex up and down even when attached to attachment bars 76 of web 78. Planar section 80 serves to space the attachment bars 76 from each other while also providing a structure to route the electrical signal conductors to and from the magnetic head 82. Magnetic head 82 may then be positioned relative to attachment bar 76 and cemented with epoxy or comparable material to the attachment bars 76. The assembly of leaf spring 68, web 78 and magnetic head 82 provides for limited movement of magnetic head 82 up and down, but is cannot readily be turned about in any other axis or deflected in any other degree of motion.

To effect the movement for magnetic head 82 described above, a VCM comprising a voice coil 90 and a magnet 86 are provided. A magnet 86 is adhesively attached to the back side 63 of vertical wall 62 within cavity 66. Voice coil 90 is attached using a similar technique to the coil mounting pad 94 of VCM spring 88.

VCM spring 88 is provided having a mounting pad 92 which permits the adhesive attachment of VCM spring 88 to the back surface 65 of vertical wall 64 with the voice coil 90 disposed within cavity 66. VCM spring 88 also has an oval span 98 intermediate attachment pad 92 and coil mount pad 94. The oval span 98 provides flexibility and the ability to move the coil mount pad 94 vertically within limits with respect to attachment pad 92. By disposing the voice coil 90 and magnet 86 within cavity 66, a closed VCM magnetic circuit is formed and stray or fringing flux is contained close to the VCM and away from the magnetic read/write head 82 and magnetic tape (not shown).

Extending from the bottom portion of coil mount pad 94 are connection tabs 96 which serve to accept a connecting material, such as an epoxy, to connect the coil mount pad 94 to the rocker 100 for bi-directional movement with the rocker 100.

Rocker 100 is formed as a beam member 102 having a latch arm 104 extending from one side thereof. On the end of beam member 102 opposite latch arm 104 is a push bar 106 attached by a flexible support 108. Flexures 110 protrude from the sides of beam 102. Flexures 110 are formed of thin leaf spring material and have been formed with tabs 112 to assist in positioning flexures 110 within slots 114 of carriage 30. Resident within slots 114, flexures 110 provide adequate bending capability and capacity to permit the rocker 100 to oscillate over a limited oscillation range. Rocker 100 is further provided with recesses 116 into which connection tabs 96 are inserted and permanently attached by an epoxy or comparable adhesive material.

Push bar 106 is engageable with and attached to beam spring end 74 of cantilever beam spring 72 which resides on the bottom of the spring 68. Push bar 106 is cemented with epoxy or comparable material to connect push bar 106 to the assembly including leaf spring 68, web 78, and magnetic head 82. The flexible web 108 interconnects the end of beam 102 and push bar 106 and provides mobility to push bar 106 with respect to the end of beam 102, thereby accommodating any slight misalignment which occurs whenever rocker 100 pivots about flexure 110 and does not perfectly follow the translation of magnetic head 82. Web 108 further minimizes any forces caused by the rocker beam 102 which may tend to urge the magnetic head 82 away from the magnetic tape surface, thereby preventing degradation of the recording or reading of the data on the tape.

In order to disable the servo control of the read/write head positioning apparatus 14, a lock arm 122 is provided. Lock arm 122 is mounted on carriage 30 and rides therewith. Carriage 30 defines a slot 124 which will accept shaft 126 and keeper 128. Keeper 128 and the end of shaft 126 are inserted into slot 124 whenever aligned; and then by turning lock arm 122, the keeper 128 will become misaligned with slot 124 and thereby retain lock arm 122 on and movable with respect to carriage 30. Lock arm 122 is further provided with a detent arm 130 which carries a detent head 132. Detent head 132 includes an engaging surface 134 which will mate with and engage detent depressions 136 on carriage 30. Further provided as a part of lock arm 122 are engagement arm 138 and arm 140.

Figure 3:
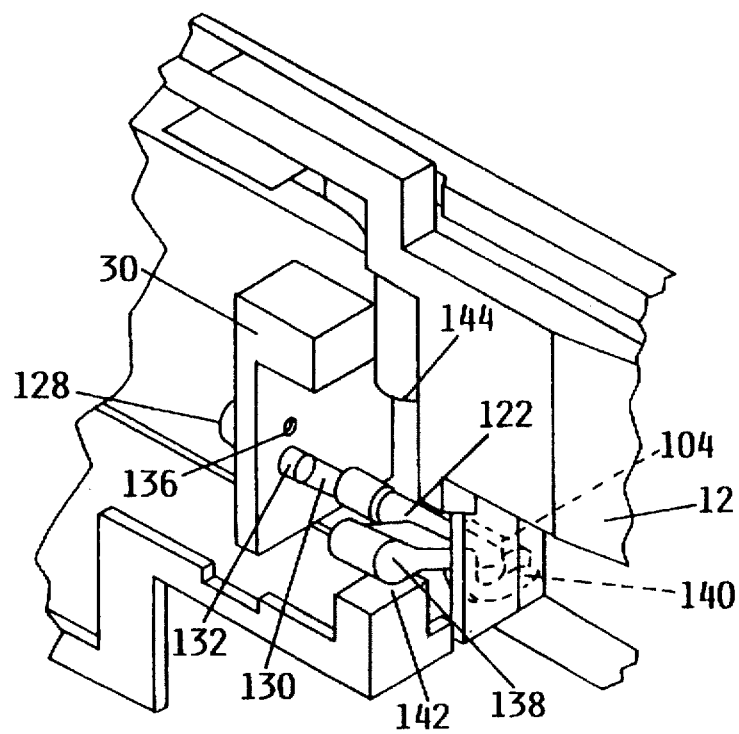
FIG. 3 is a partial perspective view of the carriage assembly of FIG. 2 showing a segment of the bridge supporting the carriage together with the servo lockout device and its interaction with the bridge.

Referring to FIGS. 2 and 3, engagement arm 138 may be displaced by engagement with a portion of bridge 12 of the tape drive 10. Bridge 12 has stop surfaces 142, 144 onto which engagement arm 138 may be moved to cause pivoting about shaft 126 of lock arm 122. The arm 140, when pivoted by engagement arm 138, will engage the undersurface of rocker latch arm 104. With arm 140 below and in engagement with rocker latch arm 104, rocker 100 can not freely rotate and is latched. Accordingly, the servo tracking movement of magnetic head 82 is disabled and the position of magnetic head 82 and position detent is totally dependent upon the position of the carriage 30. Detent surface 134 resides in one or the other of the detent depressions 136. The lower of the two detent depressions 136 defines the position of lock arm 122 in which the servo mechanism is locked out or disabled. Thus, in order to operate the lock arm 122 to cause disabling of the servo mechanism, carriage 30 must be driven upward until engagement arm 138 engages the stop surface 144 on the bridge 12.

Referring to FIGS. 2, 4 and 5A–5C, a constrained layer damper 146 is illustrated which is mounted to damp vibrations of the actuator and most particularly to attenuate the amplitude of vibrations at the first resonant frequency. The damper 146, as shown in FIG. 5, may be formed of two layers of metallic film 147, 148, each of which has a layer of viscoelastic damping material 150 on the major surface confronting the other film (FIG. 5A). When assembled, the damping material on the confronting surfaces of the metal films 147, 148 is contained therebetween (FIG. 5B) with the longer film 148 presenting an exposed surface area 152 of damping material 150 adjoining each end which affords adhesion to the abutting surface when the damper is assembled to the actuator. As used in the illustrated tape drive actuator, the metal films 147, 148 are 1 mil (0.001 inch) stainless steel. The damping material is a 5 mil thick layer of pressure sensitive viscoelastic material such as "Scotchdamp 15D 112", a product of the 3M Corporation. Either a pressure sensitive or a heat and pressure sensitive viscoelastic material may be utilized, however, the pressure sensitive material is easier to use, particularly with respect to the attachment of the damping member during actuator assembly. In use, the damper 146 is formed in a U-shaped configuration (as shown in FIG. 5C) and attached in a manner to provide a degree of freedom that extends throughout the extent of translational motion of the transducer head and its supporting elements. In the device of FIG. 2, damper 146 has one of the end surfaces 152 adhered to the surface of wall 118 (which is concealed) and the other of the end surfaces 152 adhered to the surface of planar section 80. This is shown in FIG. 4, which for clarity includes only a portion of carriage 30, the web 78, leaf spring 68 and the damper 146. The terminal end surface portions 152 of the U-shaped constrained layer damper are secured respectively to the surface 119 of carriage wall portion 118 and to surface 120 of the planar section 80 of web 78. As mounted in FIG. 4, damper 146 allows the head mounting assembly including web 78 to translate up and down while serving to attenuate the amplitude of any vibrations to which the system may be subjected, particularly those vibration occurring at resonance.

Figure 6:
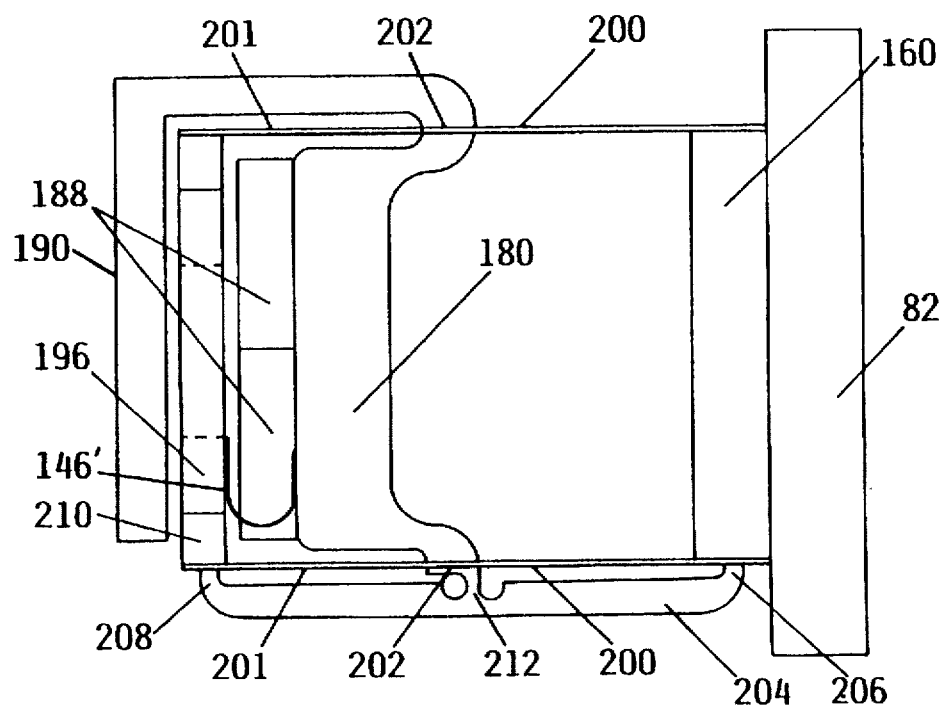
FIG. 6 shows a second embodiment of a servo mechanism carriage and servo positioned tape transducer head with a damping element attached.

Referring to FIG. 6, support 180 may be either separate or may be an integral part of a carriage such as carriage 30.

Support 180 is provided with anchor points 202 which trap and hold leaf springs 200, 201. The anchoring of leaf springs 200, 201 at anchor points 202 has the effect of forming two separate leaf springs 200, 201 out of a single piece of leaf spring material. Each set or branch of the leaf springs 200, 201 may be deflected independently of the other. Leaf springs 200 are bonded to and support magnetic head support 160 and in turn magnetic head 82. Leaf springs 201 are attached to and support VCM coil frame 210, which in turn supports VCM coil 196. Support 180 further supports VCM magnet 188 juxtaposed to coil 196. Rocker 204 is a portion of support 180 and is capable of being flexed about flexure point 212. Flexure point 212 is a narrowed section of the material making up a support 180 and rocker 204. The ends of rocker 204 are formed into flexures 206 and 208 and may be attached to the magnetic head support 160 and the VCM coil frame 210, respectively. Attachment of the flexures 206, 208 to members 160, 210 or alternatively integrally forming these members with the rocker 204 insures that movement of the rocker 204 is translated into positive displacement of the members to which it is attached or to which it is an integral part.

Under the influence of a magnetic field created by an electric current passing through VCM coil 196 and interacting with the magnetic field of VCM magnet 188, one can appreciate that movement of the voice coil 196 will cause a rocking of rocker 204 to displace magnetic head support 160.

The actuator assembly further includes a constrained layer damper 146' of the type illustrated in FIGS. 5A–5C. The U-shaped damper 146' is attached to the voice coil assembly 196 adjacent one end and to the support 180, which functions both as a part of the actuator carriage and as a core piece that aids in concentrating the flux filed in the gap between the magnets 188 and the core piece 190. The connection of damper 146' to the voice coil assembly positions the damping attachment at the most remote, practical location of attachment with respect to the pivot location of the actuator moving assembly.

While the invention has been shown and described with reference to preferred embodiments thereof, it will be understood by those skilled in the art that various changes in form and details may be made therein without departing from the spirit and scope of the invention.

What is claimed is:

1. A magnetic recording device for recording data onto a tape media comprising a read/write head for recording information on the tape media and reading information from the tape media;

an actuator including a rigid movable portion which supports said read/write head and is movable to displace said read/write head transversely to the direction of travel of said tape media;

a flexible member attached to said actuator rigid movable portion and attached to a rigid stationary location of said device; and damping means contacting a surface of said flexible member for attenuating vibration of the actuator rigid movable portion, wherein said damping means is disposed between said flexible member and an overlying flexible member to form a constrained layer damper.

2. The magnetic recording device for recording data onto a tape media of claim 1 wherein the damping means is a viscoelastic material.

3. A magnetic recording device for recording data onto a tape media comprising a read/write head for recording information on the tape media and reading information from the tape media;

an actuator including a movable portion which carries said read/write head and is movable to displace said read/write head transversely to the direction of travel of said tape media;

a thin flat flexible member attached adjacent one end to said actuator movable portion and attached adjacent an end opposite said one end to a stationary portion of said device; and damping material applied to a surface of said thin flat flexible member which attenuates vibrations to which said actuator movable portion may be subjected, wherein said damping material is disposed between said thin flat flexible member and an overlying thin flexible member to form a constrained layer damper.

4. The magnetic recording device for recording data onto a tape media of claim 3 wherein said damping material comprises a layer of viscoelastic material.

5. The magnetic recording device for recording data onto a tape media of claim 3 wherein said thin flat flexible member is attached adjacent said one end to a head supporting element of said actuator movable portion.

6. The magnetic recording device for recording data onto a tape media of claim 3 wherein said actuator movable portion includes a voice coil assembly and said thin flat flexible member is attached adjacent said one end to said voice coil assembly.

7. The magnetic recording device for recording data onto a tape media of claim 6 wherein said damping material comprises a layer of viscoelastic material.

8. A magnetic recording device for recording data onto a tape media comprising a read/write head for recording information on the tape media and reading information from the tape media;

an actuator including a movable portion which carries said read/write head and is movable to displace said read/write head transversely to the direction of travel of said tape media;

said actuator movable portion including a stiff assembly which has a resonant frequency;

a flexible member attached to said actuator movable portion stiff assembly and attached to a rigid portion of said drive; and damping means contacting a surface of said flexible member for attenuating vibration of said stiff assembly, wherein said damping means is disposed between said flexible member and an overlying flexible member to form a constrained layer damper.

9. The magnetic recording device for recording data onto a tape media of claim 8 wherein the damping means is a a viscoelastic damping material.

* * * * *